US012570214B2

(12) United States Patent (10) Patent No.: US 12,570,214 B2

Shirai (45) Date of Patent: Mar. 10, 2026

(54) MONITORING DEVICE, MONITORING METHOD, AND NON-TRANSITORY COMPUTER-READABLE MEDIUM STORING PROGRAM

(71) Applicant: TOYOTA JIDOSHA KABUSHIKI KAISHA, Toyota (JP)

(72) Inventor: Ryo Shirai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 35 days.

(21) Appl. No.: 18/539,917

(22) Filed: Dec. 14, 2023

(65) Prior Publication Data

US 2024/0246490 A1 Jul. 25, 2024

(30) Foreign Application Priority Data

Jan. 24, 2023 (JP) ................................. 2023-008927

(51) Int. Cl.
B60R 1/29 (2022.01)
B60R 1/30 (2022.01)
G06F 3/01 (2006.01)
(52) U.S. Cl.
CPC .................. B60R 1/29 (2022.01); B60R 1/30 (2022.01); G06F 3/013 (2013.01); B60R 2300/105 (2013.01); B60R 2300/8006 (2013.01)
(58) Field of Classification Search
None
See application file for complete search history.

(56) References Cited

U.S. PATENT DOCUMENTS

| | | | |
|---|---|---|---|
| 5,801,763 A | 9/1998 | Suzuki | |
| 6,927,694 B1 | 8/2005 | Smith et al. | |
| 9,753,459 B2 | 9/2017 | Mueller | |
| 11,941,895 B1 * | 3/2024 | Walsh | G06T 3/4007 |
| 2013/0057668 A1 | 3/2013 | Kim | |
| 2014/0313309 A1 * | 10/2014 | Matsuo | A61B 5/0077 |
| | | | 348/78 |
| 2016/0063304 A1 | 3/2016 | Yamashita | |
| 2019/0130579 A1 * | 5/2019 | Heo | G02B 27/0093 |
| 2022/0252924 A1 | 8/2022 | Noble | |

FOREIGN PATENT DOCUMENTS

| | | |
|---|---|---|
| JP | H07-156712 A | 6/1995 |
| JP | H09-021611 A | 1/1997 |
| JP | 2005-296382 A | 10/2005 |
| JP | 2013-054717 A | 3/2013 |
| JP | 2016-051315 A | 4/2016 |
| JP | 2022-123858 A | 8/2022 |
| KR | 10-2013-0054767 A | 5/2013 |
| KR | 10-2019-0083155 A | 7/2019 |

* cited by examiner

*Primary Examiner* — Samira Monshi

(74) *Attorney, Agent, or Firm* — Dinsmore & Shohl LLP

(57) ABSTRACT

A monitoring device that performs monitoring of an occupant of a vehicle by at least one monitoring mode from out of a first monitoring mode or a second monitoring mode that is different from the first monitoring mode. The monitoring device includes a setting section that sets a monitoring mode for monitoring the occupant based on a detection result of part of a body of the occupant using at least one monitoring mode from out of the first monitoring mode or the second monitoring mode.

6 Claims, 10 Drawing Sheets

FIG.2

| | WITHOUT IR-CUTIR | | WITH IR-CUT | |
|---|---|---|---|---|
| | CLEAR LENSES | BLACK LENSES | CLEAR LENSES | BLACK LENSES |
| DAYTIME (BRIGHT) | | | | |
| NIGHT (DARK) | | | | |

FIG.3

| | | WITHOUT IR-CUT | | WITH IR-CUT | |
| --- | --- | --- | --- | --- | --- |
| | | CLEAR LENSES | BLACK LENSES | CLEAR LENSES | BLACK LENSES |
| DAYTIME (BRIGHT) | | | | | |
| NIGHT (DARK) | | | | | |

Figure 7:
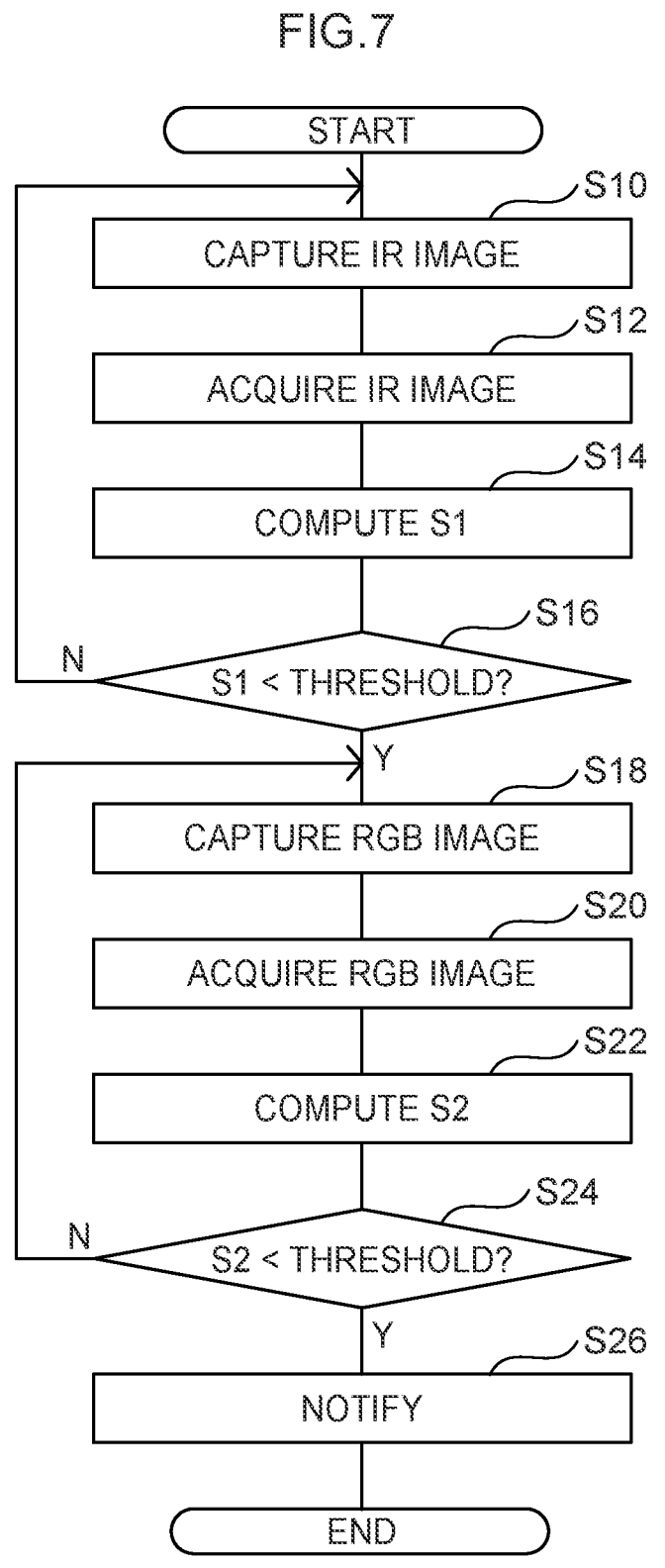

```
           START

│
            ▼
   ┌─────────────────────┐  S10
   │  CAPTURE IR IMAGE   │
   └─────────────────────┘
            │
            ▼
   ┌─────────────────────┐  S12
   │  ACQUIRE IR IMAGE   │
   └─────────────────────┘
            │
            ▼
   ┌─────────────────────┐  S14
   │    COMPUTE S1       │
   └─────────────────────┘
            │
            ▼
         S16
   N ◁── S1 < THRESHOLD? ──▷
            │ Y
            ▼
   ┌─────────────────────┐  S18
   │  CAPTURE RGB IMAGE  │
   └─────────────────────┘
            │
            ▼
   ┌─────────────────────┐  S20
   │  ACQUIRE RGB IMAGE  │
   └─────────────────────┘
            │
            ▼
   ┌─────────────────────┐  S22
   │    COMPUTE S2       │
   └─────────────────────┘
            │
            ▼
         S24
   N ◁── S2 < THRESHOLD?
            │ Y
            ▼
   ┌─────────────────────┐  S26
   │      NOTIFY         │
   └─────────────────────┘
            │
            ▼
           END
```

MONITORING DEVICE, MONITORING METHOD, AND NON-TRANSITORY COMPUTER-READABLE MEDIUM STORING PROGRAM

CROSS-REFERENCE TO RELATED APPLICATION

This application claims priority under 35 USC 119 from Japanese Patent Application No. 2023-008927, filed on Jan. 24, 2023, the disclosure of which is incorporated by reference herein.

BACKGROUND

Technical Field

The present disclosure relates to a monitoring device, to a monitoring method, and to a non-transitory computer-readable medium storing a program.

Related Art

In technology disclosed in Japanese Patent Application Laid-Open (JP-A) No. 2022-123858, monitoring of a driver of a vehicle is performed using a camera capable of capturing an image in both a visible wavelength region and in an infrared wavelength region.

For example, in a case in which monitoring is performed by imaging an occupant of a vehicle using infrared rays (IR), sometimes the eyes, which are part of the body of the occupant, are unable to be detected when the occupant is wearing glasses that block IR, such as glasses including IR-cut lenses. There is a possibility that the detection rate of part of the body of the occupant will fall in such cases.

SUMMARY

The present disclosure provides a monitoring device, a monitoring method, and a non-transitory computer-readable medium storing a program that may suppress decrease of a detection rate of part of the body of an occupant of the vehicle.

A first aspect of the present disclosure is a monitoring device that performs monitoring of an occupant of a vehicle by at least one monitoring mode from out of a first monitoring mode and a second monitoring mode that is different from the first monitoring mode. The monitoring device includes a setting section that sets a monitoring mode for monitoring the occupant based on a detection result of part of a body of the occupant using at least one monitoring mode from out of the first monitoring mode and the second monitoring mode.

In the monitoring device of the first aspect, the monitoring mode is appropriately set based on the detection result of the part of the body of the occupant of the vehicle. Thereby, the monitoring device of the first aspect may suppress decrease of the detection rate of the part of the body of the occupant of the vehicle. As a result thereof, unnecessary notification, actuation of control, and the like may be suppressed.

In a second aspect of the present disclosure, in the first aspect, in a case in which a part of the body is unable to be detected by one monitoring mode from out of the first monitoring mode and the second monitoring mode, the setting section may switch from the one monitoring mode to the other monitoring mode.

In the monitoring device of the second aspect, switching is performed to the other monitoring mode in a case in which the part of the body of the occupant of the vehicle is unable to be detected by the one monitoring mode, and so as a result of enabling monitoring to be performed with a comparatively small computational load, processing load may be reduced. Moreover, as a result of being able to suppress decrease of the detection rate of the part of the body of the occupant of the vehicle, unnecessary notification, actuation of control, and the like may be suppressed.

In a third aspect of the present disclosure, in the second aspect, the first monitoring mode may be a monitoring mode in which an image of the occupant is captured with IR, the second monitoring mode may be a monitoring mode in which an image of the occupant is captured with visible light, the first monitoring mode may be a default monitoring mode, and the setting section may switch to the second monitoring mode in a case in which eyes or a face of the occupant are unable to be detected as the part of the body using the first monitoring mode.

In the second monitoring mode in which an image of the occupant is captured with visible light, in a case in which, for example, the occupant is wearing glasses including black lenses, sometimes the eyes of the occupant are unable to be detected in a case in which a surrounding scene is reflected, there is an effect from extraneous light, or the like. In the first monitoring mode in which an image of the occupant is captured with IR, the eyes may be detected without being affected by extraneous light. The eyes of the occupant are unable to be detected in the first monitoring mode in a case in which the occupant is wearing glasses including IR-cut lenses. Moreover, sometimes the second monitoring mode is affected by extraneous light in a case in which the inside of the vehicle becomes temporarily dark such as when the vehicle enters a tunnel or the like. In the monitoring device of the third aspect, the first monitoring mode is the default monitoring mode, and a switch is made to the second monitoring mode in a case in which eyes or a face of the occupant are unable to be detected using the first monitoring mode. This thereby may enable the part of the body of the occupant of the vehicle to be detected with good efficiency.

In a fourth aspect of the present disclosure, in the second aspect, the first monitoring mode may be a monitoring mode in which an image of the occupant is captured with IR, the second monitoring mode may be a monitoring mode in which an image of the occupant is captured with visible light, the second monitoring mode may be a default monitoring mode, and the setting section may switch to the first monitoring mode in a case in which eyes or a face of the occupant are unable to be detected as the part of the body using the second monitoring mode.

In the monitoring device of the fourth aspect, the second monitoring mode in which an image of the occupant is captured with visible light is the default monitoring mode, and a switch is made to the first monitoring mode in a case in which eyes or a face of the occupant are unable to be detected using the second monitoring mode. There is accordingly no need to always illuminate with IR, enabling a reduction in power consumption.

In a fifth aspect of the present disclosure, in the first aspect, the setting section may set the detection result employed for monitoring the occupant by comparing the respective detection results by the first monitoring mode and the second monitoring mode.

In the monitoring device of the fifth aspect, the two monitoring modes are employed together. Accordingly, the fifth aspect may suppress decrease in the detection rate of the part of the body of the occupant of the vehicle, and may suppress unnecessary notification, actuation of control, and the like. Moreover, due to the two monitoring modes being employed together to perform detection processing of the part of the body of the occupant at the same time, the detection processing speed may be raised compared to cases in which a switch is made to another monitoring mode after one monitoring mode.

In a sixth aspect of the present disclosure, in the fifth aspect, the first monitoring mode may be a monitoring mode in which an image of the occupant is captured with IR, the second monitoring mode may be a monitoring mode in which an image of the occupant is captured with visible light, the part of the body of the occupant may be eyes, and the setting section may set the detection result for use in monitoring the occupant by the monitoring mode having a smaller variation in gaze, as the detection result from out of the first monitoring mode and the second monitoring mode.

In the monitoring device of the sixth aspect, the first monitoring mode is a monitoring mode in which an image of the occupant is captured with IR, and so the eyes of the occupant may be detected even in a case in which the inside of the vehicle is dark and cases in which the occupant is wearing glasses including black lenses. The second monitoring mode is a monitoring mode in which an image of the occupant is captured with visible light, and so the eyes of the occupant may be detected even in a case in which the occupant is wearing glasses including IR-cut lenses.

In a seventh aspect of the present disclosure, in any one of the first aspect to the sixth aspect, may further include a notification section that notifies not being able to monitor the occupant in a case in which eyes or a face of the occupant are unable to be detected as the part of the body by at least one out of the first monitoring mode and the second monitoring mode.

In the monitoring device of the seventh aspect, the occupant is able to ascertain that the eyes or face of the occupant are unable to be detected.

An eight aspect is a monitoring method executed by a computer to perform monitoring of an occupant of a vehicle by at least one monitoring mode from out of a first monitoring mode and a second monitoring mode that is different from the first monitoring mode. The monitoring method includes processing of setting a monitoring mode for monitoring the occupant based on a detection result of part of a body of the occupant using at least one monitoring mode from out of the first monitoring mode and the second monitoring mode.

A ninth aspect is a non-transitory computer-readable medium storing a program to cause a computer to execute processing to perform monitoring of an occupant of a vehicle by at least one monitoring mode from out of a first monitoring mode and a second monitoring mode that is different from the first monitoring mode. The processing includes setting a monitoring mode for monitoring the occupant based on a detection result of part of a body of the occupant using at least one monitoring mode from out of the first monitoring mode and the second monitoring mode.

According to the above aspects, the monitoring device, the monitoring method, and the non-transitory computer-readable medium storing a program of the present disclosure may suppress decrease in a detection rate of part of a body of an occupant of a vehicle.

BRIEF DESCRIPTION OF THE DRAWINGS

Exemplary embodiments will be described in detail based on the following figures, wherein:

FIG. 2 is a diagram illustrating examples of ways in which eyes are depicted when a face has been imaged with IR;

FIG. 3 is a diagram illustrating examples of ways in which eyes are depicted when a face has been imaged with visible light;

FIG. 5 is a diagram to explain a trained model;

FIG. 7 is a flowchart illustrating an example of monitoring processing according to the first exemplary embodiment;

DETAILED DESCRIPTION

Detailed explanation follows regarding examples of embodiments to implement the present disclosure, with reference to the drawings.

First Exemplary Embodiment

Figure 1:
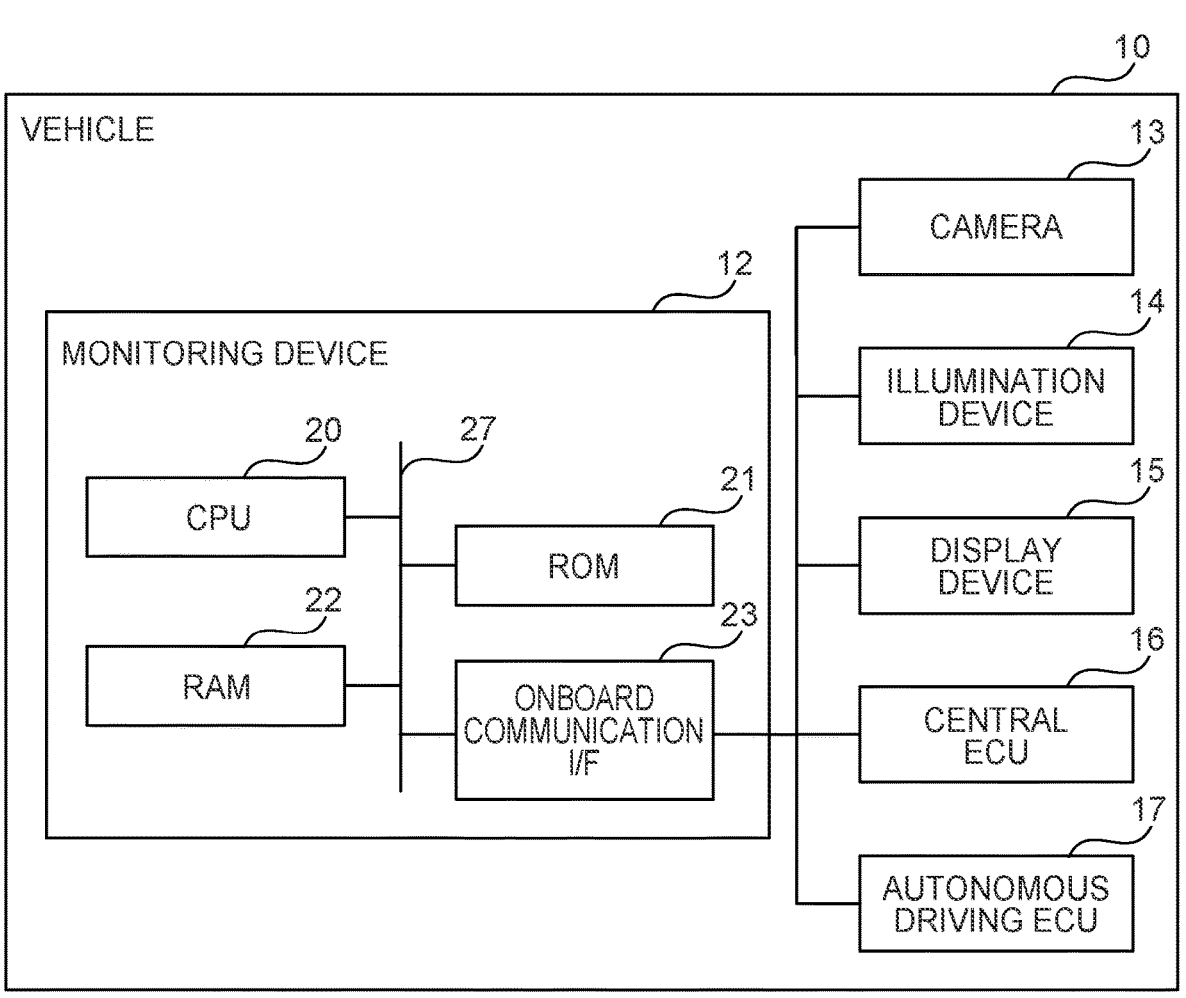
FIG. 1 is a block diagram illustrating an example of a configuration of a vehicle.

First description follows regarding a configuration of a vehicle 10 according to the present exemplary embodiment, with reference to FIG. 1. As illustrated in FIG. 1, the vehicle 10 includes a monitoring device 12, a camera 13, an illumination device 14, a display device 15, a central electronic control unit (ECU) 16, and an autonomous driving ECU 17. In the present exemplary embodiment, description follows regarding an example of an embodiment in which a driver of a vehicle is employed as a target for monitoring by the monitoring device 12, and eyes are employed as part of a body of the detection target driver. The monitoring device 12 according to the present exemplary embodiment is applied to an autonomous driving vehicle capable of switching between autonomous driving and manual driving. Note that application may also be made to an autonomous driving vehicle capable of remote driving in addition to autonomous driving.

The monitoring device 12 includes a central processing unit (CPU) 20, a read only memory (ROM) 21, a random access memory (RAM) 22, and an onboard communication interface (I/F) 23. The CPU 20, the ROM 21, the RAM 22, and the onboard communication I/F 23 are each connected together through a bus 27 so as to be capable of communicating with each other. A computer such as an ECU or the like may be given as an example of the monitoring device 12.

The CPU 20 is a central processing unit that executes various programs and controls each section. Namely, the CPU 20 reads a program from the ROM 21, and executes the program using the RAM 22 as a workspace.

The ROM 21 serving as a storage section stores various programs and various data. The RAM 22 serves as a workspace and temporarily stores programs and data.

The onboard communication I/F 23 is an interface for connection to the camera 13, the illumination device 14, the display device 15, the central ECU 16, and the autonomous driving ECU 17. This interface employs a communication standard using a controller area network (CAN) protocol.

The camera 13 includes a red/green/blue (RGB)-IR image sensor capable of capturing images both in a visible wavelength region and in an infrared wavelength region. The camera 13 is sometimes called an RGB-IR camera. The camera 13 is controlled by the monitoring device 12 so as to capture an image of a driver, serving as an example of an occupant of the vehicle, using visible light. The camera 13 also captures an image of the driver using IR under control by the monitoring device 12. The images captured by the camera 13 are output to the monitoring device 12 through the onboard communication I/F 23.

The illumination device 14 illuminates IR onto the driver. Illumination start and illumination stop of IR by the illumination device 14 is controlled by the monitoring device 12. An IR-light emitting diode (LED) may be given as an example of the illumination device 14.

The display device 15 displays messages under control by the monitoring device 12. A liquid crystal display provided to an instrument panel may be given as an example of the display device 15.

The central ECU 16 performs overall control of various ECUs installed to the vehicle 10. The autonomous driving ECU 17 performs control related to autonomous driving.

As illustrated in FIG. 2, eyes are depicted in an image irrespective of a color of lenses of glasses, in a case in which an image of a face of the driver is captured using IR and also a case in which the driver is wearing glasses including lenses that do not cut IR. In such cases the eyes are also depicted in an image irrespective of how bright it is inside the vehicle. Moreover, the eyes are not depicted in an image, in a case in which the image of a face of the driver is captured using IR and also a case in which the driver is wearing glasses including IR-cut lenses.

However, as illustrated in FIG. 3, the eyes are depicted in an image even when the driver is wearing glasses including IR-cut lenses and clear lenses in a case in which the image of the face of the driver is captured with visible light and it is also sufficiently bright inside the vehicle. Moreover, the eyes are not depicted in an image in a case in which the image of the face of the driver is captured with visible light and the driver is wearing glasses including black lenses. Moreover, in a case in which an image of the face of the driver is captured with visible light, the face itself is not depicted in the image when it is dark inside the vehicle.

Namely, the circumstances in which the eyes are depicted differs between cases in which an image of the face of the driver is captured with IR and cases in which an image of the face of the driver is captured with visible light. The monitoring device 12 according to the present exemplary embodiment includes a function to switch between a first monitoring mode in which an image of the driver is captured with IR, and a second monitoring mode in which an image of the driver is captured with visible light. In the present exemplary embodiment, the first monitoring mode is a default monitoring mode. Reference here to being a default monitoring mode means that it is the monitoring mode set when starting monitoring processing.

Figure 4:
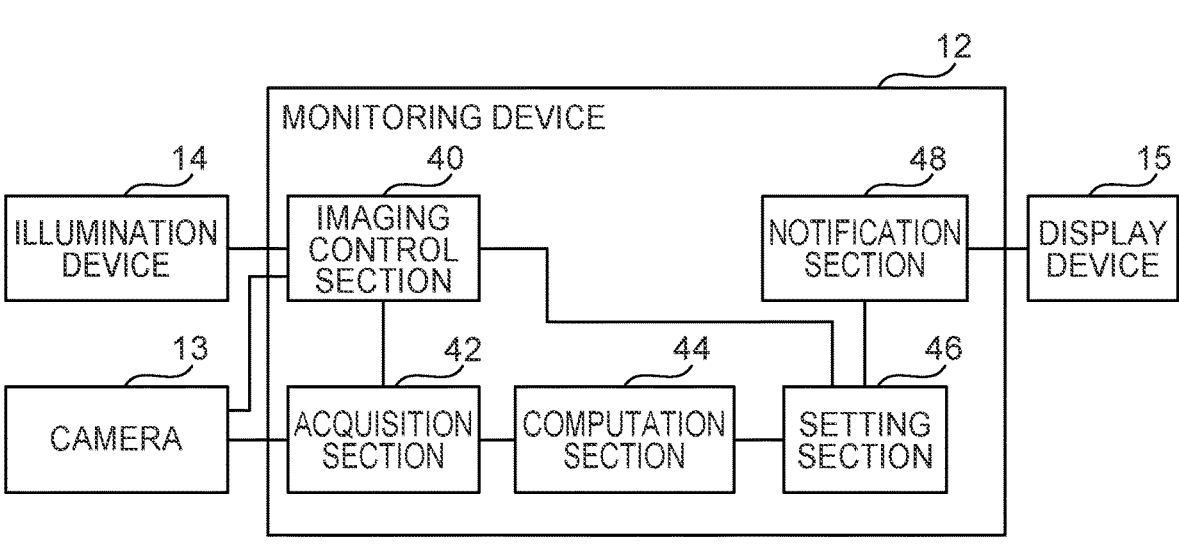
FIG. 4 is a block diagram illustrating an example of a functional configuration of a monitoring device according to a first exemplary embodiment.

Explanation follows regarding a functional configuration of the monitoring device 12 according to the present exemplary embodiment, with reference to FIG. 4. As illustrated in FIG. 4, the monitoring device 12 includes an imaging control section 40, an acquisition section 42, a computation section 44, a setting section 46, and a notification section 48. The CPU 20 functions as the imaging control section 40, the acquisition section 42, the computation section 44, the setting section 46, and the notification section 48 by executing a program stored on the ROM 21.

In the first monitoring mode, the imaging control section 40 performs control of the illumination device 14 to illuminate the face of the driver with IR and performs control of the camera 13 to capture an image of the face of the driver using IR.

In the second monitoring mode, the imaging control section 40 performs control of the camera 13 to capture an image of the face of the driver with visible light. Namely, in the second monitoring mode, the camera 13 captures an image of the face of the driver under natural light. In the following, an image captured by the camera 13 in the first monitoring mode is called an IR image, and an image captured by the camera 13 in the second monitoring mode is called a RGB image.

The acquisition section 42 acquires the RGB image captured by the camera 13 under control by the imaging control section 40. The acquisition section 42 also acquires an IR image captured by the camera 13 under control by the imaging control section 40.

Figure 5:
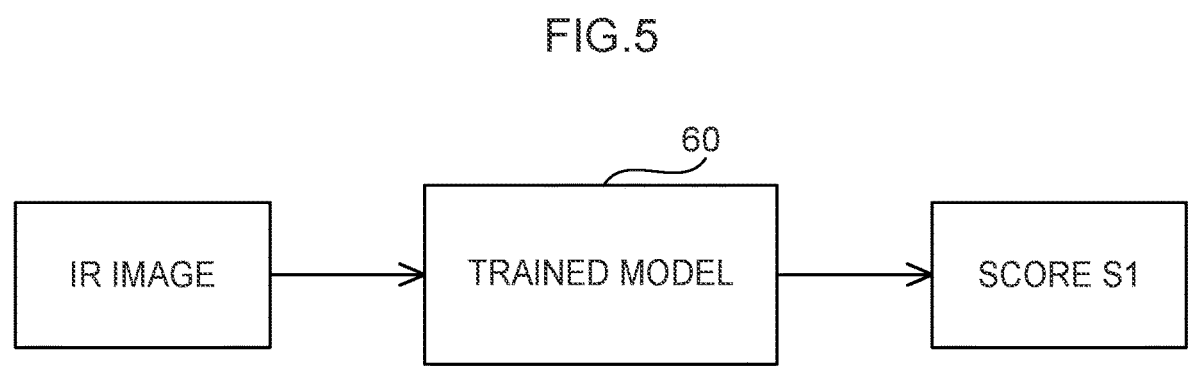

The computation section 44 uses the IR image to compute a score S1 representing the possibility that the eyes are depicted in the IR image. In the present exemplary embodiment the computation section 44 computes the score S1 by inputting an IR image into a trained model 60 illustrated in FIG. 5. As illustrated in FIG. 5, the trained model 60 is a model that uses the IR image as input and outputs the score S1. The trained model 60 is obtained in advance by performing machine learning using multiple pairs of the IR images and the scores S1 as training data. The trained model 60 is, for example, stored on the ROM 21. The score S1 is a value that is greater the higher possibility that eyes are depicted in the IR image. The score S1 is an example of a detection result of part of the body of the occupant in the first monitoring mode.

Figure 6:
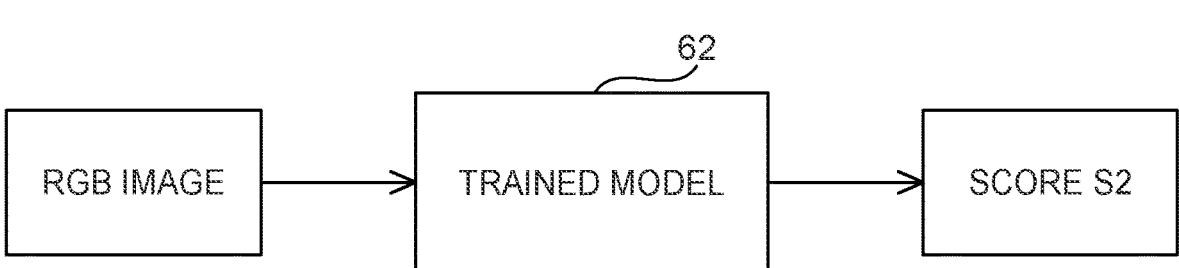
FIG. 6 is a diagram to explain a trained model.

The computation section 44 uses the RGB image to compute a score S2 representing the possibility that the eyes are depicted in the RGB image. In the present exemplary embodiment the computation section 44 computes a score S2 by inputting the RGB image into a trained model 62 illustrated in FIG. 6. As illustrated in FIG. 6, the trained model 62 is a model that is input with the RGB image that outputs the score S2. The trained model 62 is obtained in advance by performing machine learning using multiple pairs of the RGB images and the scores S2 as training data. The trained model 62 is, for example, stored on the ROM 21. The score S2 is a value that is greater the higher the possibility that the eyes are depicted in the RGB image. The score S2 is an example of a detection result of part of the body of the occupant in the second monitoring mode.

The setting section 46 sets the monitoring mode for monitoring the driver based on the scores S1. More specifically, the setting section 46 switches the monitoring mode from the first monitoring mode to the second monitoring mode in a case in which the eyes of the driver are unable to be detected in the first monitoring mode. In the present exemplary embodiment, the setting section 46 determines that the eyes of the driver are unable to be detected in the first monitoring mode, in a case in which the score S1 computed by the computation section 44 is less than a predetermined threshold TH1.

The notification section 48 notifies that monitoring of the driver is unable to be performed, in a case in which the eyes of the driver are unable to be detected in both the first monitoring mode and the second monitoring mode. More specifically, for example, the notification section 48 performs notification by controlling to display on the display device 15 a message that monitoring of the driver is unable to be performed. Note that the notification section 48 may perform notification by ringing a buzzer tone, may perform notification by displaying an icon, and may perform notification by reading the above message out using speech. The notification section 48 may also combine two or more of these methods of notification.

Next, description follows regarding operation of the monitoring device 12 according to the present exemplary embodiment, with reference to FIG. 7. The CPU 20 executes the monitoring processing illustrated in FIG. 7 by executing a program stored on the ROM 21. The monitoring processing illustrated in FIG. 7 is, for example, executed in a case in which the ignition switch has been switched to the ON state.

At step S10 of FIG. 7, the imaging control section 40 performs control of the illumination device 14 to illuminate IR onto the face of the driver, and performs control of the camera 13 to capture an IR image of the face of the driver with IR. At step S12, the acquisition section 42 acquires an IR image captured by the camera 13 under the control of step S10.

At step S14, the computation section 44 computes the score S1 by inputting the IR image acquired at step S12 into the trained model 60. At step S16, the setting section 46 determines whether or not the score S1 computed at step S14 is less than the threshold TH1. Processing returns to step S10 when this determination is negative. Namely, the first monitoring mode is continued, in a case in which the eyes of the driver can be detected by the first monitoring mode.

Processing proceeds to step S18 in a case in which the determination of step S16 is affirmative, namely, in a case in which eyes of the driver were unable to be detected in the first monitoring mode. At step S18, the imaging control section 40 performs control of the camera 13 to capture an RGB image of the face of the driver with visible light. At step S20, the acquisition section 42 acquires an RGB image captured by the camera 13 under the control of step S18.

At step S22, the computation section 44 computes the score S2 by inputting the RGB image acquired at step S20 into the trained model 62. At step S24, the setting section 46 determines whether or not the score S2 computed at step S22 is less than the threshold TH1. Processing returns to step S18 in a case in which this determination is negative determination. Namely, the second monitoring mode is continued in a case in which the eyes of the driver can be detected in the second monitoring mode.

Processing proceeds to step S26 in a case in which the determination of step S24 was affirmative, namely, in a case in which the eyes of the driver were unable to be detected in the second monitoring mode. At step S26, the notification section 48 performs notification that monitoring of the driver is unable to be performed as described above. The monitoring processing is ended when the processing of step S26 is finished. Note that processing may return to step S10 after the processing of step S26 has been finished. In such cases, the monitoring mode is returned to the first monitoring mode. A detection result of the eyes of the driver by the first monitoring mode or by the second monitoring mode is, for example, employed in monitoring for distracted eye movements, closed eyes, or the like.

As described above, the present exemplary embodiment may suppress decrease in a detection rate of part of the body of the occupant of the vehicle. In a case in which the gaze of the driver is unable to be detected during autonomous driving, there may be a possibility in which a hands-on request that requests a return from autonomous driving to manual driving being notified, each time the gaze of the driver is unable to be detected. Further, where may be cases in which warnings are unnecessary notified during travelling on a general road (namely, not during autonomous driving). The present exemplary embodiment may reduce this possibility. Moreover, system availability may be raised.

Figure 8:
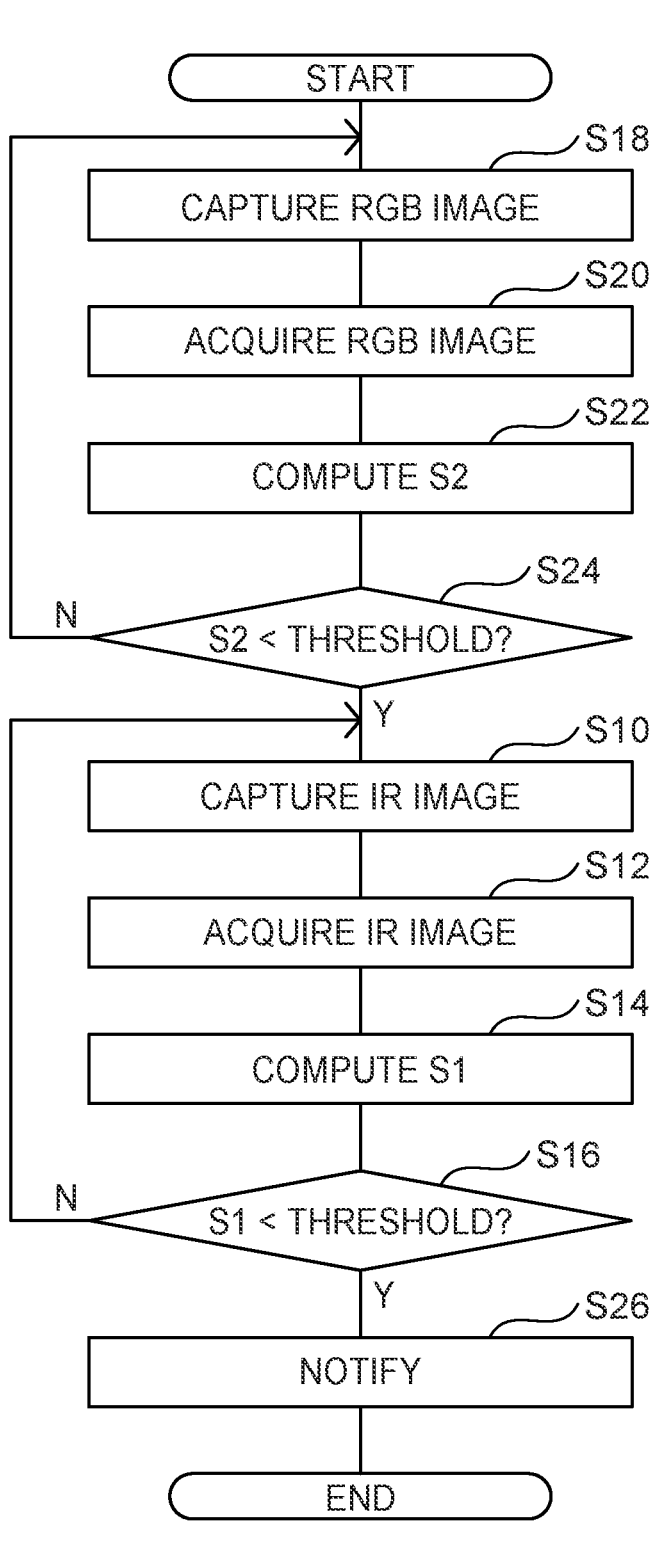
FIG. 8 is a flowchart illustrating an example of monitoring processing according to a modified example.

Note that although an example has been described of a case in which the default monitoring mode is the first monitoring mode in the first exemplary embodiment, there is no limitation thereto. The second monitoring mode may be the default monitoring mode. In such an exemplary embodiment, the setting section 46 switches the monitoring mode from the second monitoring mode to the first monitoring mode in a case in which the eyes of the driver are unable to be detected in the second monitoring mode. An example of monitoring processing of such an embodiment is illustrated in FIG. 8. The monitoring processing of this exemplary embodiment only differs from the monitoring processing illustrated in FIG. 7 in the step execution sequence, and so in FIG. 8 the same step numbers as those of FIG. 7 are appended to steps for executing the same processing as that of FIG. 7, and explanation thereof will be omitted. In this embodiment, the power consumption may be reduced since there is no need to illuminate with IR all of the time.

Moreover, in the first exemplary embodiment, description has been given of a case in which the computation section 44 employs the IR image to compute the score S1 representing the possibility that the eyes are depicted in the IR image, however, there is no limitation thereto. The computation section 44 may be configured to employ the IR image to compute a score S3 representing the possibility that the eyes are unable to be detected in the IR image. In such an embodiment too, the computation section 44 is able to compute the score S3 by inputting the IR image to the trained model obtained in advance by machine learning. The computation section 44 may compute a reciprocal of the score S1 as the score S3. Similarly, the computation section 44 may be configured to employ the RGB image to compute a score S4 representing the possibility that the eyes are not depicted in the RGB image.

In such cases, the setting section 46 may determine that the eyes of the driver are unable to be detected in the first monitoring mode in a case in which the score S3 is a threshold TH2 or greater. Moreover, the setting section 46 may determine that the eyes of the driver are unable to be detected in the first monitoring mode, in a case in which the score S1 is the threshold TH1 or greater, and an absolute value of a difference between the score S1 and the score S3 is a threshold TH3 or greater.

Moreover, in such cases, the setting section 46 may set so as to perform monitoring temporarily in the second monitoring mode in a case in which the score S1 is less than the threshold TH1 and an absolute value of a difference between the score S1 and the score S3 is less than the threshold TH3. In such cases, the setting section 46 may switch the monitoring mode from the first monitoring mode to the second monitoring mode, in a case in which the score S2 computed in the second monitoring mode is the threshold TH1 or greater, and the absolute value of a difference between the score S2 and the score S4 is the threshold TH3 or greater.

Moreover, in such cases, the setting section 46 may compare the scores S1 and S3 and the absolute value of a difference between the scores S1 and S3 in the first monitoring mode, with the scores S2 and S4 and the absolute value of a difference between the scores S2 and S4 in the second monitoring mode, and select the monitoring mode for which the values are greatest.

Moreover, the setting section 46 may determine whether or not the eyes of the driver can be detected in the first monitoring mode using the greater value from out of the scores S1, S3. Moreover, the setting section 46 may determine whether or not the eyes of the driver can be detected using the greater value from out of the scores S2, S4 in the second monitoring mode.

Second Exemplary Embodiment

In the present exemplary embodiment description follows of an embodiment that employs both the first monitoring mode and the second monitoring mode. Note that the configuration of the vehicle 10 according to the present exemplary embodiment is the same as that of the vehicle 10 according to the first exemplary embodiment (see FIG. 1), and so explanation thereof will be omitted.

Figure 9:
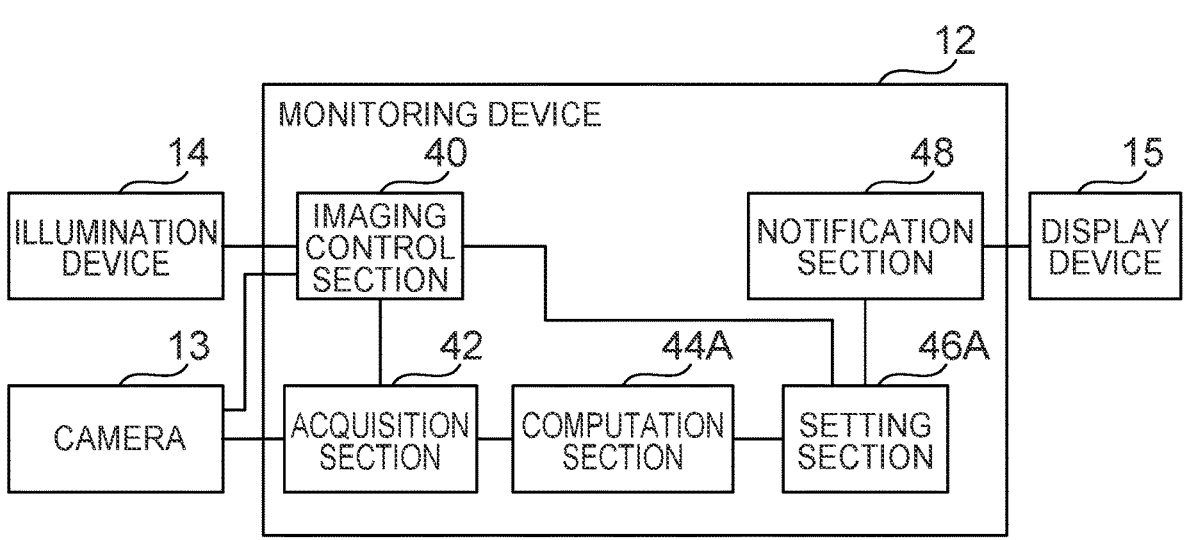
FIG. 9 is a block diagram illustrating an example of a functional configuration of a monitoring device according to a second exemplary embodiment.

Description follows regarding a functional configuration of a monitoring device 12 according to the present exemplary embodiment, with reference to FIG. 9. The same reference numerals are appended to functional sections having the same function as those of the monitoring device 12 according to the first exemplary embodiment (see FIG. 4) and explanation thereof will be omitted.

As illustrated in FIG. 9, the monitoring device 12 includes an imaging control section 40, an acquisition section 42, a computation section 44A, a setting section 46A, and a notification section 48. The CPU 20 functions as the imaging control section 40, the acquisition section 42, the computation section 44A, the setting section 46A, and the notification section 48 by executing a program stored on the ROM 21.

The computation section 44A includes the following functions in addition to the functions of the computation section 44 according to the first exemplary embodiment. The computation section 44A uses plural successively captured IR images to compute a variation V1 in the gaze of the driver in the first monitoring mode. Moreover, the computation section 44A uses plural successively captured RGB images to compute a variation V2 in gaze of the driver in the second monitoring mode.

The setting section 46A sets a detection result for use in monitoring of the driver by comparing detection results of part of the body of the driver in the first monitoring mode and the second monitoring mode, respectively. In the present exemplary embodiment, the setting section 46 sets the detection result for use in monitoring of the driver by the monitoring mode having the smallest value from out of the variation V1 in the first monitoring mode and the variation V2 in the second monitoring mode.

Figure 10:
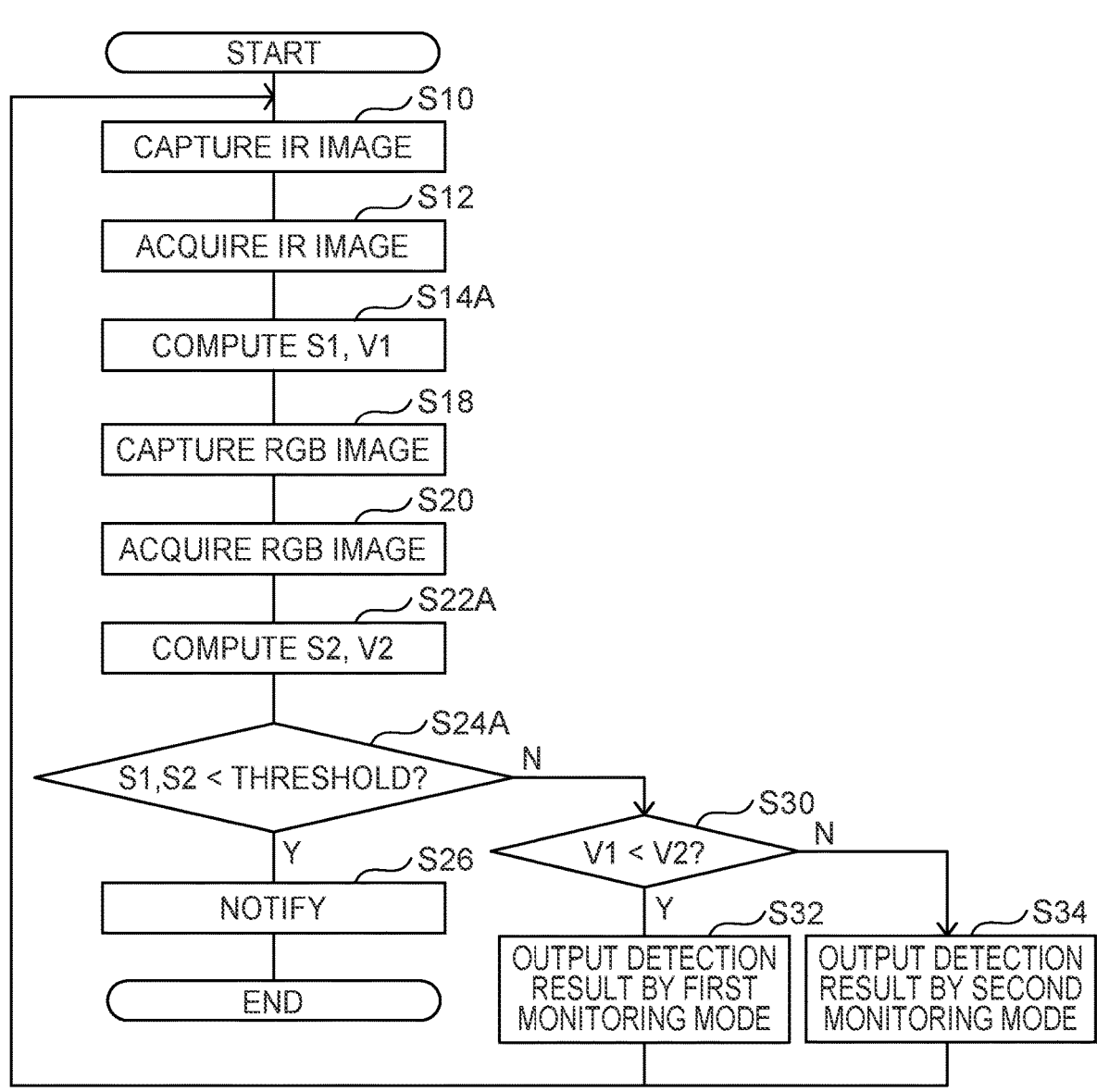
FIG. 10 is a flowchart illustrating an example of monitoring processing according to the second exemplary embodiment.

Next, description follows regarding operation of the monitoring device 12 according to the present exemplary embodiment, with reference to FIG. 10. The CPU 20 executes the monitoring processing illustrated in FIG. 10 by executing the program stored on the ROM 21. The monitoring processing illustrated in FIG. 10 may for example, be executed in a case in which the ignition switch has been switched to the ON state. The same step numbers as those of FIG. 7 are appended in FIG. 10 to the steps for executing the same processing as that of FIG. 7, and explanation thereof will be omitted Step S14A of FIG. 10 is executed instead of step S14 of FIG. 7. At step S14A, the computation section 44A computes a score S1 by inputting the IR image acquired at step S12 to the trained model 60. Furthermore, the computation section 44A computes the variation V1 of the gaze of the driver using plural IR images successively captured at step S10.

Moreover, the step S16 of FIG. 7 is omitted and step S22A of FIG. 10 is executed in place of step S22. At step S22A, the computation section 44A computes a score S2 by inputting the RGB image acquired at step S20 to the trained model 62. Furthermore, the computation section 44A computes the variation V2 of the gaze of the driver using plural RGB images successively captured at step S18 in the second monitoring mode. Note that the execution sequence of step S10 to step S14A of FIG. 10 may be swapped with or executed in parallel to step S18 to step S22A thereof.

A step S24A of FIG. 10 is executed instead of the step S24 of FIG. 7. At step S24A, the setting section 46 determines whether or not the score S1 computed at step S14A and the score S2 computed at step S22A are both less than the threshold TH1. Processing proceeds to step S26 in a case in which this determination is affirmative, and processing proceeds to step S30 in a case in which this determination is negative.

At step S30, the setting section 46 determines whether or not the variation V1 computed at step S14A is smaller than the variation V2 computed at step S22A. Processing proceeds to step S32 in a case in which this determination is affirmative, and processing proceeds to step S34 in a case in which this determination is negative.

At step S32, the setting section 46 outputs a detection result of eyes of the driver in the first monitoring mode to the central ECU 16. Processing returns to step S10 when the processing of step S32 has ended. However, at step S34 the setting section 46 outputs a detection result of eyes of the driver in the second monitoring mode to the central ECU 16. Processing returns to step S10 when the processing of step S34 has ended. The central ECU 16 takes the detection result input from the setting section 46 by the processing of step S32 or step S34 and employs the detection result in monitoring of the driver, and controls various ECUs.

As described above, the present exemplary embodiment may suppress decrease in the detection rate of detecting the part of the body of the occupant of the vehicle.

Note that although in each of the exemplary embodiments described above application has been made to the driver of a vehicle as the target for monitoring by the monitoring device 12, there is no limitation thereto. An occupant other than the driver of a vehicle may be applied as the target for monitoring by the monitoring device 12.

Moreover, although in each of the exemplary embodiments described application has been made to the eyes as the part of the body of the detection target driver, there is no limitation thereto. Application may be made to a face as part of a body of the detection target driver, and application may be made to a combination of eyes and a face therefor.

Moreover, although in each of the exemplary embodiments described above examples have been described of cases which a single RGB-IR camera is employed as the camera 13, there is no limitation thereto. Plural RGB-IR cameras may be employed. In such cases the first monitoring mode and the second monitoring mode can be continued even when there is a fault with one of the RGB-IR cameras.

Moreover, a camera capable of capturing an RGB image and a camera capable of capturing an IR image may be separate bodies. In such cases, the camera capable of capturing IR images is employed in the first monitoring mode, and the camera capable of capturing RGB images is employed in the second monitoring mode. Moreover, an RGB-IR camera that combines a camera capable of capturing RGB images and a camera capable of capturing IR images as separate bodies that have been integrated together may be employed. Plural cameras may also be employed in each of the monitoring modes. In such cases, the setting section 46 may determine whether or not eyes are able to be detected using plural images obtained by capturing the face of the driver from plural different angles.

Moreover, in each of the exemplary embodiments, the notification section 48 may notify a hands-on request to request autonomous driving to be returned to manual driving in a case in which the eyes of the driver are not being detected in both the first monitoring mode and the second monitoring mode.

Moreover, in each of the exemplary embodiment described above the score S1 and the score S2 are output to the central ECU 16. In such cases, the central ECU 16 may use the score S1 and the score S2 to perform control of autonomous driving using the autonomous driving ECU 17.

Moreover, in the second exemplary embodiment described above, in a case in which the eyes are being detected in the RGB image, the amount of IR illuminated may be reduced by reducing the illumination time of IR by the illumination device 14 and by weakening the intensity of the IR. This thereby enables the power consumption to be reduced.

The processing executed in the exemplary embodiments described above by the CPU reading software (a program) may be executed by various processors other than a CPU. Examples of such processors include programmable logic devices (PLD) that allow circuit configuration to be modified post-manufacture, such as a field-programmable gate array (FPGA), and dedicated electric circuits, these being processors including a circuit configuration custom-designed to execute specific processing, such as an application specific integrated circuit (ASIC). Moreover, each of the above processing may be executed by any one of these various types of processor, or may be executed by a combination of two or more of the same type or different types of processor (such as plural FPGAs, or a combination of a CPU and an FPGA). The hardware structure of these various types of processors is more specifically an electric circuit combining circuit elements such as semiconductor elements.

Furthermore, although the exemplary embodiments described above are configured with various data stored on the ROM or in storage, there is no limitation thereto. For example, a recording medium such as a compact disk (CD), digital versatile disk (DVD), universal serial bus (USB) memory, or the like may be employed as a storage section. In such cases, various programs and data may be stored on this recording medium.

Although description has been given regarding the vehicle 10 according to the exemplary embodiments, obviously various embodiments may be implemented within a scope not departing from the present disclosure.

What is claimed is:

1. A monitoring device that performs monitoring of an occupant of a vehicle by at least one of a first monitoring mode in which an image of the occupant is captured with IR or a second monitoring mode in which the image of the occupant is captured with visible light, the monitoring device comprising:
    a memory; and
    a processor coupled to the memory, the processor being configured to:
        set a monitoring mode for monitoring the occupant based on a detection result of part of a body of the occupant, using at least one of the first monitoring mode or the second monitoring mode,
        switch to the second monitoring mode in a case in which the part of the body of the occupant is unable to be detected using the first monitoring mode, and
        set the detection result employed for monitoring the occupant by comparing respective detection results by the first monitoring mode and the second monitoring mode.

2. The monitoring device of claim 1, wherein:
    the processor is configured to switch to the second monitoring mode in a case in which eyes or a face of the occupant are unable to be detected as the part of the body, using the first monitoring mode.

3. The monitoring device of claim 1, wherein:
    the part of the body of the occupant is eyes, and
    the processor is configured to set the detection result for use in monitoring the occupant, to whichever of the first monitoring mode or the second monitoring mode has a smaller variation in gaze as the detection result.

4. The monitoring device of claim 1, wherein the processor is further configured to indicate that is not able to monitor the occupant, in a case in which eyes or a face of the occupant are unable to be detected as the part of the body, by at least one of the first monitoring mode or the second monitoring mode.

5. A monitoring method executed by a computer to perform monitoring of an occupant of a vehicle by at least one of a first monitoring mode or a second monitoring mode that is different from the first monitoring mode, the monitoring method comprising:
    setting a monitoring mode for monitoring the occupant based on a detection result of part of a body of the occupant, using at least one of the first monitoring mode in which an image of the occupant is captured with IR or the second monitoring mode in which the image of the occupant is captured with visible light; and
    switch to the second monitoring mode in a case in which the part of the body of the occupant is unable to be detected using the first monitoring mode; and
    set the detection result employed for monitoring the occupant by comparing respective detection results by the first monitoring mode and the second monitoring mode.

6. A non-transitory computer-readable medium storing a program executable by a computer to perform processing to monitor an occupant of a vehicle by at least one of a first monitoring mode or a second monitoring mode that is different from the first monitoring mode, the processing comprises:
    setting a monitoring mode for monitoring the occupant based on a detection result of part of a body of the occupant, using at least one of the first monitoring mode in which an image of the occupant is captured with IR or the second monitoring mode in which the image of the occupant is captured with visible light;
    switch to the second monitoring mode in a case in which the part of the body of the occupant is unable to be detected using the first monitoring mode; and
    setting the detection result employed for monitoring the occupant by comparing respective detection results by the first monitoring mode and the second monitoring mode.

* * * * *